(12) United States Patent
Mikuriya

(10) Patent No.: US 9,163,989 B2
(45) Date of Patent: Oct. 20, 2015

(54) RECORDING APPARATUS

(75) Inventor: Hideo Mikuriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 628 days.

(21) Appl. No.: 12/613,369

(22) Filed: Nov. 5, 2009

(65) Prior Publication Data

US 2010/0110138 A1 May 6, 2010

(30) Foreign Application Priority Data

Nov. 6, 2008 (JP) ................. 2008-285992

(51) Int. Cl.
- *B41J 29/393* (2006.01)
- *B41J 2/015* (2006.01)
- *B41J 2/01* (2006.01)
- *B41J 29/13* (2006.01)
- *G01J 3/50* (2006.01)
- *B41J 29/02* (2006.01)
- *G01J 3/02* (2006.01)

(52) U.S. Cl.
CPC .. *G01J 3/50* (2013.01); *B41J 29/02* (2013.01); *B41J 29/393* (2013.01); *G01J 3/0202* (2013.01)

(58) Field of Classification Search
USPC ..................... 347/19–20, 101, 108
See application file for complete search history.

(56) References Cited

U.S. PATENT DOCUMENTS

| | | | | |
|---|---|---|---|---|
| 6,075,614 A | * | 6/2000 | Ohtsuka et al. | 358/1.1 |
| 6,148,604 A | * | 11/2000 | Salt et al. | 60/797 |
| 6,307,748 B1 | * | 10/2001 | Lin et al. | 361/704 |
| 2008/0218777 A1 | * | 9/2008 | Matsuzawa et al. | 358/1.9 |
| 2008/0240829 A1 | * | 10/2008 | Miyazaki et al. | 400/76 |
| 2008/0252948 A1 | * | 10/2008 | Onishi | 358/504 |
| 2010/0110138 A1 | * | 5/2010 | Mikuriya | 347/19 |

FOREIGN PATENT DOCUMENTS

| | | | | |
|---|---|---|---|---|
| FR | 2750176 A1 | * | 12/1997 | ............ F16B 7/18 |
| JP | 11-326056 | | 11/1999 | |
| JP | 5381025 B2 | * | 1/2014 | |

* cited by examiner

*Primary Examiner* — Jason Uhlenhake
(74) *Attorney, Agent, or Firm* — Workman Nydegger

(57) ABSTRACT

There is provided a recording apparatus including a colorimeter unit. The colorimeter unit includes a colorimeter including a color-measuring device that acquires colorimetric data from a recording surface of a recording medium; a first member that is a frame that supports the colorimeter; and a second member that is a frame fastened to the first member using a fastening device. The fastening device has an elastic member and fastens the first member and the second member together relatively movably against the elastic force of the elastic member.

8 Claims, 17 Drawing Sheets

RECORDING APPARATUS

BACKGROUND

1. Technical Field

The present invention relates to a recording apparatus equipped with a colorimeter unit that measures the colors of a colorimetric pattern recorded on a recording medium using a color-measuring device.

2. Related Art

In printed-matter production sites, color proofing has been performed in which proofing is performed before final printing, and it is determined, with reference to an image displayed on the printed sample proof and a color patch for indication that is displayed together with the image, whether the color of image data is reproduced with high fidelity.

On the other hand, digital matching is widely used in which the color of an image on a CRT monitor and the color of an image displayed on the print sample output from an output unit, such as a printer or an image sensor, are electrically matched on the basis of a color management file called a profile. The digital matching is executed in print-data production sites and printed-matter production sites (see JP-A-11-326056).

In recent years, color proofing, called offpress proofing, is widely used in which a proof sheet is directly output from print data for making a printing plate to reduce the time required for proofing, and an ink-jet recording apparatus equipped with a color-measuring device is used to output such a proof sheet.

A colorimeter that includes the color-measuring device is accommodated in a housing frame together with a drier and is incorporated in an ink-jet recording apparatus, as an integrated colorimeter unit. The colorimeter is supported by a main frame, and the drier is supported by a drier frame. The fastening of the main frame and the drier frame and the fastening of these frames and the housing frame are performed using screws to achieve high-rigidity frame structure as a whole.

The main body of the ink-jet recording apparatus is slightly distorted, for example, in the surface of the main body facing the color-measuring device and holding a recording medium, due to variations in component accuracy, assembly accuracy, etc. In such a case, the high-rigidity frame structure causes the problems below.

The high-rigidity frame structure of the colorimeter unit causes variations in the distance between the color-measuring device and the holding surface (surface to be measured, hereinafter referred to as a colorimetric surface) in a region to be measured (hereinafter referred to as a colorimetric region) if the holding surface has the distortion, with the colorimeter unit mounted in the recording-apparatus main body. That is, the colorimeter unit cannot be deformed so as to absorb the distortion of the holding surface to thereby shape the overall form along the distortion by itself because of the high rigidity of the frame structure. This precludes the distance between the color-measuring device and the holding surface from being held constant in the entire colorimetric region due to the influence of the distortion of the holding surface. The inconstant distance in the entire colorimetric region will decrease the colorimetric accuracy of the color-measuring device.

In particular, a large-sized recording apparatus has the problem of generating the distortion to decrease the colorimetric accuracy because the holding surface that holds the recording medium is long in the crosswise direction of the recording apparatus.

SUMMARY

An advantage of some aspects of the invention is to prevent a decrease in the colorimetric accuracy of a recording apparatus equipped with a colorimeter unit.

According to a first aspect of the invention, there is provided a recording apparatus including a colorimeter unit. The colorimeter unit includes a colorimeter including a color-measuring device that acquires colorimetric data from a recording surface of a recording medium; a first member that is a frame that supports the colorimeter; and a second member that is a frame fastened to the first member using a fastening device. The fastening device has an elastic member and fastens the first member and the second member together relatively movably against the elastic force of the elastic member.

According to this aspect, the fastening device has an elastic member and is configured to fasten the first member and the second member together relatively movably against the elastic force of the elastic member. Thus, even if slight distortion is present on the surface of the recording apparatus main body facing the color-measuring device, which is a holding surface that holds a recording medium, with the colorimeter unit mounted on the recording apparatus main body, the influence of the distortion can be absorbed by the structure of relative movement.

That is, since the two members can relatively move against the elastic force of the elastic member, the colorimeter unit can shape the overall form by itself along the distortion by transforming so as to absorb the distortion of the holding surface. This allows the distance between the color-measuring device and the holding surface to be held constant in the overall color-measuring region, thus preventing the colorimetric accuracy from decreasing.

It is preferable that the recording apparatus according to this aspect further include a drier that uses a space formed between the first member and the second member as a drying-air chamber. Application of the invention to such a colorimeter unit including the drier having this chamber has a great advantage.

In the recording apparatus according to this aspect, it is preferable that the fastening device be attached to a portion at which the two members to be fastened are in contact with each other; and the fastening device be configured such that the elastic member is disposed on an outer surface of at least a first member of the two members to be fastened, the outer surface being opposite an inner surface thereof at which the two members are in contact, and that the two members can move in a direction in which the two members separate from each other against the elastic force of the elastic member.

In this case, since the fastening device that is attached to a portion at which the two members to be fastened are in contact is configured such that the two members that are in contact can be moved in a direction in which the members separate from each other against the elastic force of the elastic member, the above-described advantages can be offered with a simple structure and at low cost.

In the recording apparatus according to this aspect, it is preferable that the fastening device further include a fastening screw and a spacer that determines the gap between the head of the screw and the first member of the two members, and that the elastic member be located in the gap.

In this case, the recording apparatus has a spacer that determines the gap between the head of the fastening screw and the first member of the two members, and the elastic member is located in the gap. This facilitates assembly that needs determination of the gap.

In the recording apparatus according to this aspect, it is preferable that the fastening device be attached to a portion at which the two members to be fastened are spaced apart; and that the fastening device be configured such that the elastic member is disposed between the two members to be fastened, and that the two members can move in a direction in which the two members come close to each other against the elastic force of the elastic member.

In this case, since the fastening device that is attached to a portion at which the two members to be fastened are spaced apart is configured such that the two members that are spaced apart can be moved in a direction in which the members move close to each other against the elastic force of the elastic member, the above-described advantages can be offered with a simple structure and at low cost.

Furthermore, with the structure in which the two members are spaced apart (for example, the chamber etc.), the two members are forced to be separated to a determined position and are held using the elastic force of the elastic member, the relative positions can be firmly determined and held.

In the recording apparatus according to this aspect, it is preferable that the fastening device further include a positioning shaft that is located between the two members to be fastened apart from each other, a first end of the positioning shaft being fixed to a first member of the members, and that determines the relative positions of the two members; and a screw fastened to a second end of the positioning shaft, and that a second member of the two members be located in the gap provided between a head of the screw and the positioning shaft and be pressed onto the head of the screw for positioning by the elastic member.

In this case, the second member of the two members is located in the gap provided between the head of the screw and the positioning shaft and is pressed onto the head of the screw for positioning by the elastic member. Accordingly, even if the two members are spaced apart, the relative positions of the two members can be firmly determined and can be held using the elastic force of the compressed elastic member with a simple structure.

Furthermore, the second member that is pressed onto the head of the screw has a hole through which the screw passes. This may cause a space enclosed by the two members (a chamber etc.) to communicate with the exterior through the hole, to preclude providing sufficient air tightness required for the space. However, with this structure, since the periphery of the hole in the second member is pressed onto the head of the screw due to the urging force of the elastic member, as described above, the hole is blocked from the exterior by the head of the screw, thus preventing communication with the exterior.

Furthermore, since the screw is fastened to the positioning shaft to bring its head into contact with the opposing surface of the positioning shaft, the relative positions of the two members that are spaced apart, with the positioning shaft therebetween, can be ensured. The presence of the positioning shaft allows the bare minimum distance between the two member to be held and prevents an excess load on the elastic member.

In the recording apparatus according to this aspect, it is preferable that the elastic member be retained to the positioning shaft. In this case, since the elastic member can be retained to the positioning shaft during assembly, the assembly is easy.

BRIEF DESCRIPTION OF THE DRAWINGS

The invention will be described with reference to the accompanying drawings, wherein like numbers reference like elements.

DESCRIPTION OF EXEMPLARY EMBODIMENTS

A recording apparatus equipped with a colorimeter unit according to an embodiment of the invention will be described hereinbelow. First, an ink-jet recording apparatus 100 is taken as an exemplary embodiment of the recording apparatus of the invention, the outline of the overall configuration thereof will be described with reference to the drawings. The ink-jet recording apparatus 100 described here is a large-sized ink-jet recording apparatus capable of recording on a large-sized sheet-like recording medium R of A3-size or more (hereinafter also referred to as a cut paper P) or a large-sized roll recording medium R of A1-size, A1-plus size, B0-size, or B0-plus size (hereinafter also referred to as a roll paper R).

Figure 1:
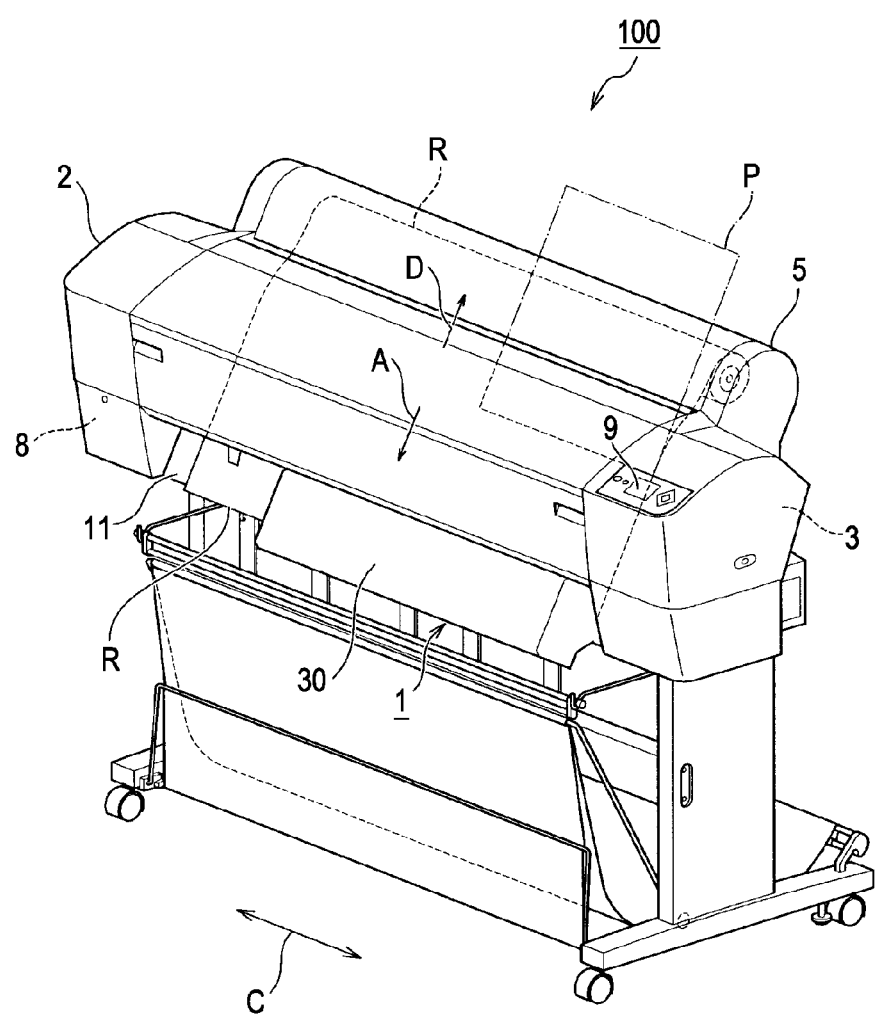
FIG. 1 is a perspective view showing the appearance of an ink-jet recording apparatus, with a body cover mounted.
Figure 2:
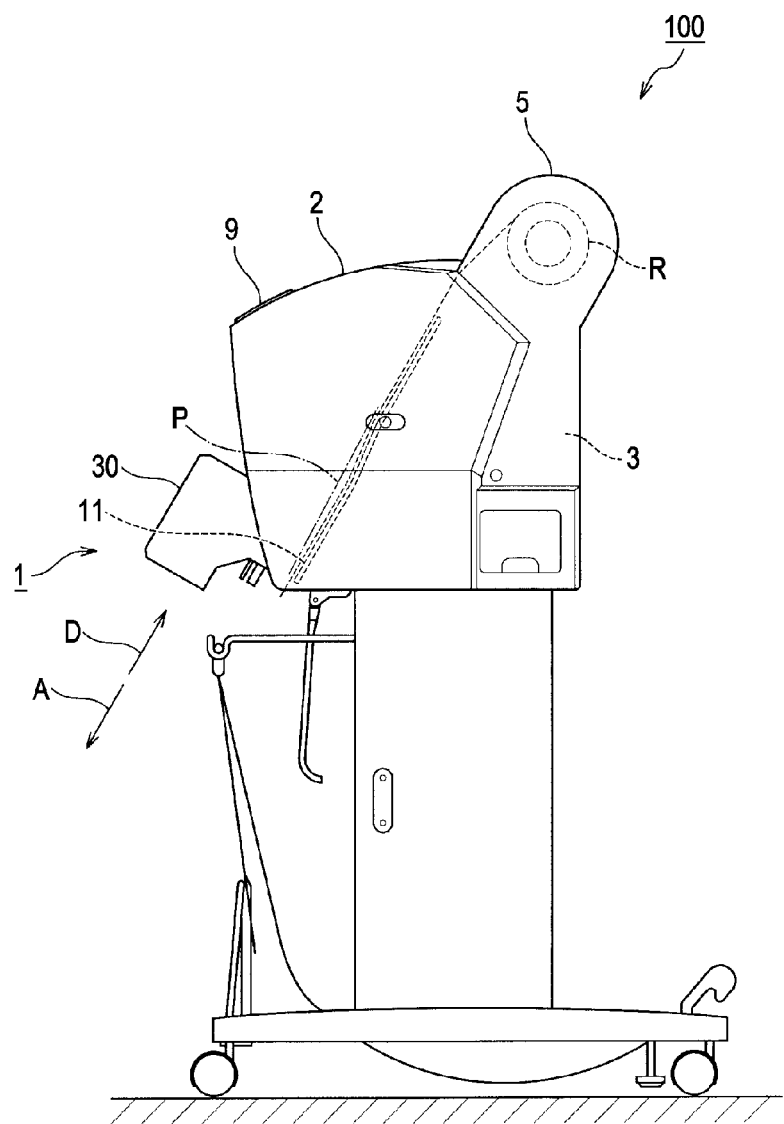
FIG. 2 is a side view showing the appearance of the ink-jet recording apparatus, with the body cover mounted.
Figure 3:
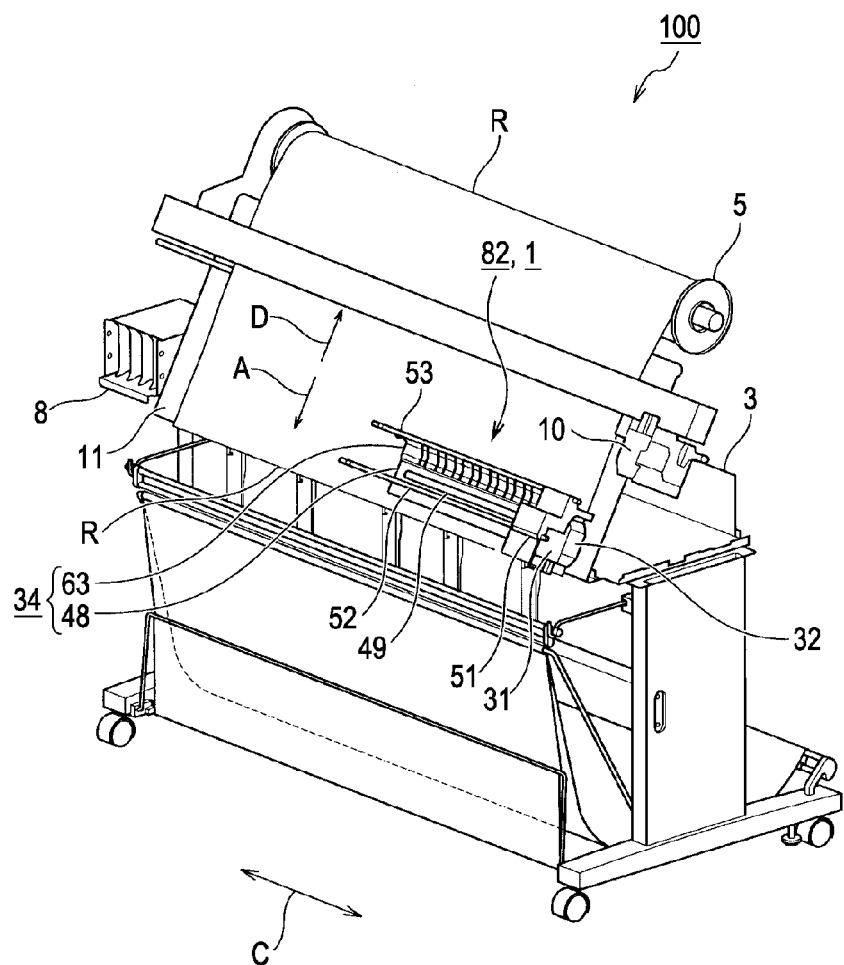
FIG. 3 is a perspective view of the ink-jet recording apparatus, with the body cover removed.
Figure 4:
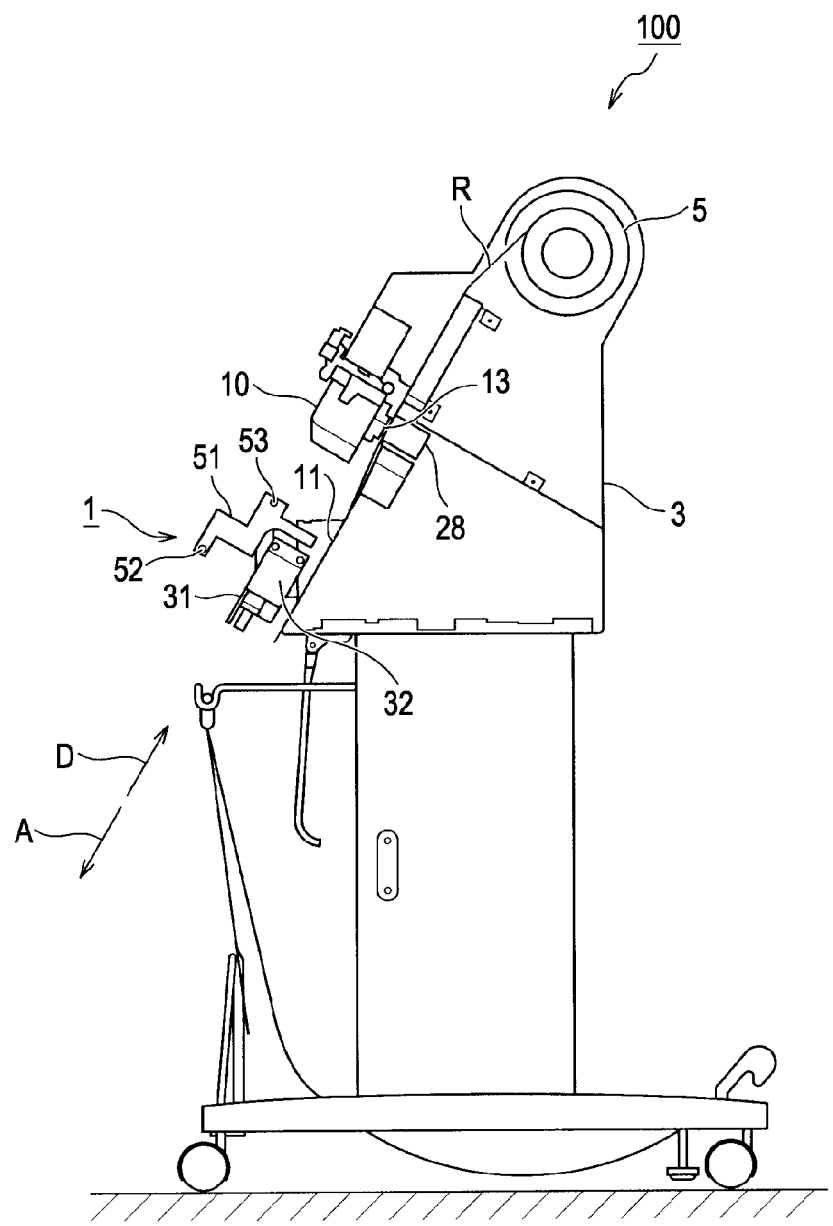
FIG. 4 is a side view of the ink-jet recording apparatus, with the body cover removed.

FIG. 1 is a perspective view showing the appearance of the ink-jet recording apparatus 100, with a body cover 2 mounted; FIG. 2 is a side view showing the appearance of the ink-jet recording apparatus 100, with the body cover 2 mounted; FIG. 3 is a perspective view of the ink-jet recording apparatus 100, with the body cover 2 removed; FIG. 4 is a side view of the ink-jet recording apparatus 100, with the body cover 2 removed; and FIG. 5 is a cross-sectional side view showing in outline the internal configuration of essential parts of the ink-jet recording apparatus 100.

As shown in FIGS. 3 and 4, the ink-jet recording apparatus 100 is equipped with a recording-apparatus main body 3. As shown in FIGS. 1 and 2, the recording-apparatus main body 3 is covered with the body cover 2. The recording-apparatus main body 3A has, at the upper rear, a roll paper holder 5 formed of a spindle that can hold the roll paper R and a pair of flange-like roll paper holders. In addition, a cartridge holder 8 having a plurality of cartridge slots that can accommodate individual color cartridges is provided at a portion close to the left end, for an example, of the front of the recording-apparatus main body 3.

In addition, an operation panel 9 that controls various operating instructions is supported by an appropriate bracket, at a portion close to the right end, for an example, of the front of the ink-jet recording apparatus 100. The recording-apparatus main body 3 is provided with a transport guide plate 11 in a forwardly downward-bent posture at about 60°, which guides the roll paper R held by the roll paper holder 5 or the cut paper P toward the lower front that is a transporting direction A. The upper surface of the transport guide plate 11 serves as a surface of the recording-apparatus main body 3 facing a color-measuring device 31, to be described later, and holding the recording medium.

Figure 5:
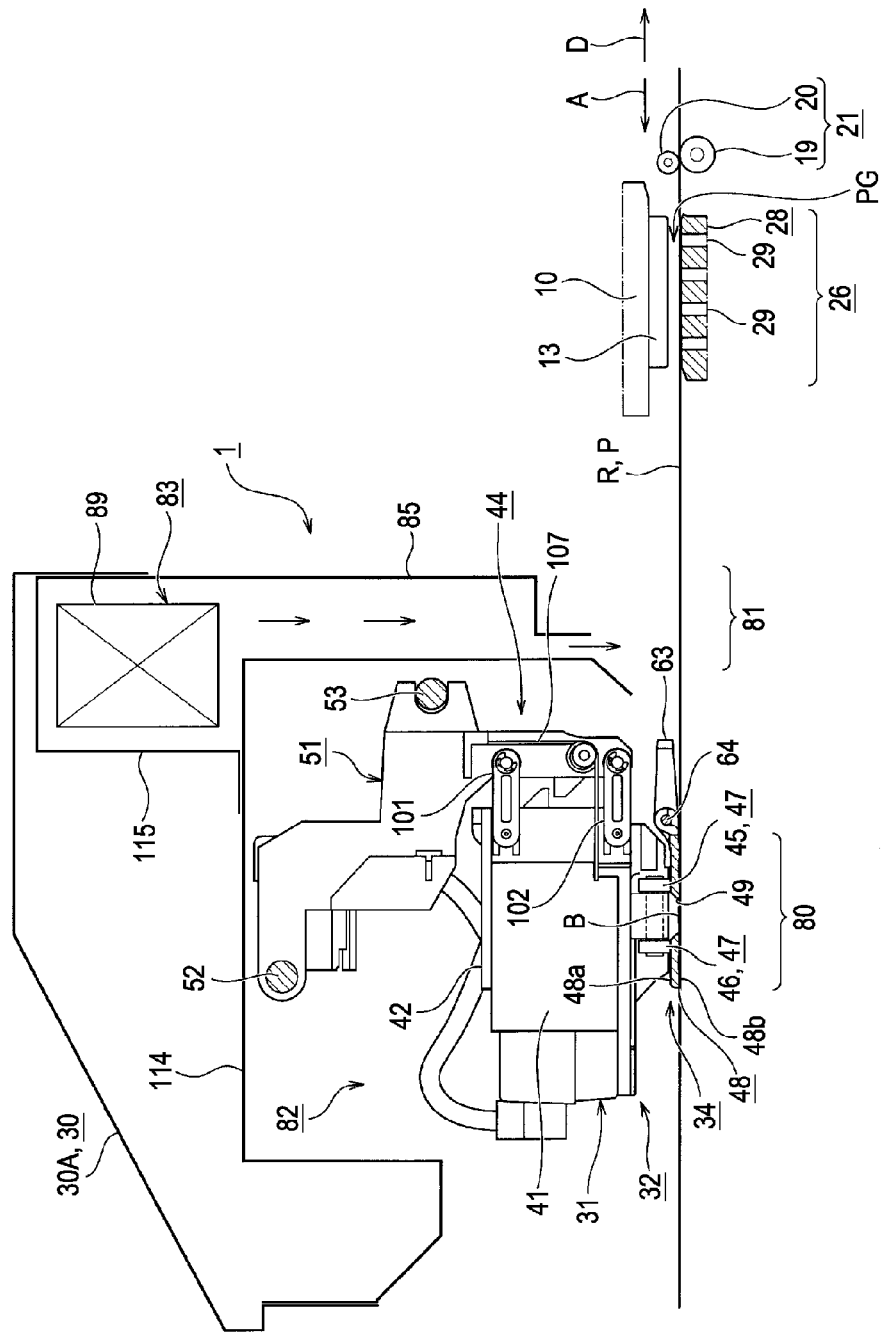
FIG. 5 is a cross-sectional side view showing in outline the internal configuration of the ink-jet recording apparatus.

As shown in FIG. 5, a transport roller 2 constituted of a pair of nip rollers, that is, a transport driving roller 19 and a transport driven roller 20, is provided at an upstream position of the transport path of the roll paper R and the cut paper P. Between the two, the transport driving roller 19 can rotate in both forward and reverse directions, for example. The roll paper R or the cut paper P nipped by the transport roller 21 is transported in both the lower front transporting direction A and an upper rear returning direction D.

A recording position 26 is provided downstream of the transport roller 21. A record head 13 is located above the recording position 26. The record head 13 is held by a carriage 10 and is configured to move back and forth along the width of the recording-apparatus main body 3. On the other hand, a platen 28 is provided below the recording position 26, with a gap PG therebetween. The platen 28 has suction holes 29. The roll paper R or the cut paper P transported on the platen 28 is subjected to recording while being adsorbed onto the platen 28 by air suction through the suction holes 29 and is transported to a drying region 81 and a color-measuring region 80. Drying at the drying region 81 and color measurement at the color-measuring region 80 are executed by a detachable colorimeter unit 1 covered with a housing frame 30.

Embodiment

Next, the colorimeter unit 1, which is the characteristic configuration of the invention, applied to the thus-configured ink-jet recording apparatus 100 will be specifically described.

Figure 6:
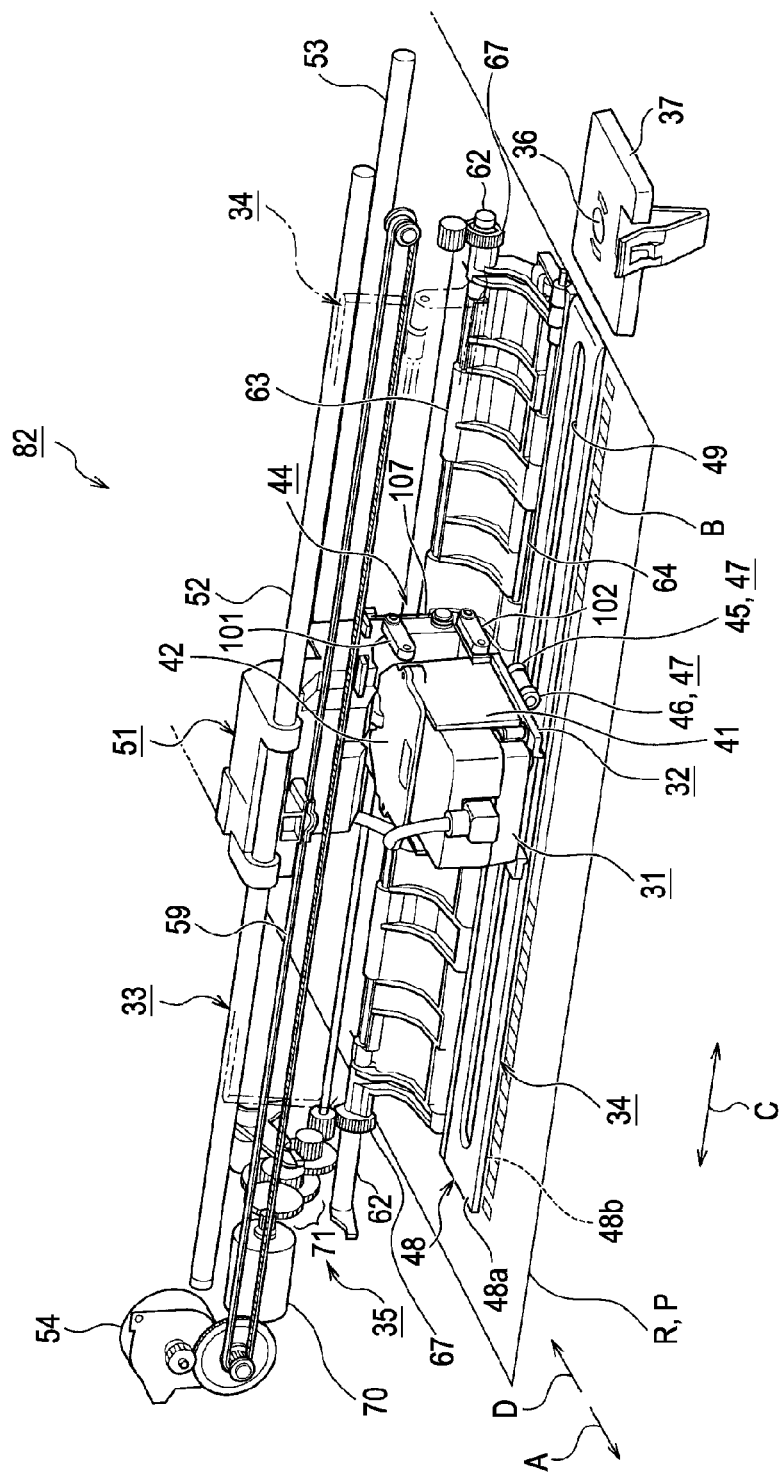
FIG. 6 is a perspective view showing the operating state of a colorimeter during color measurement.
Figure 7:
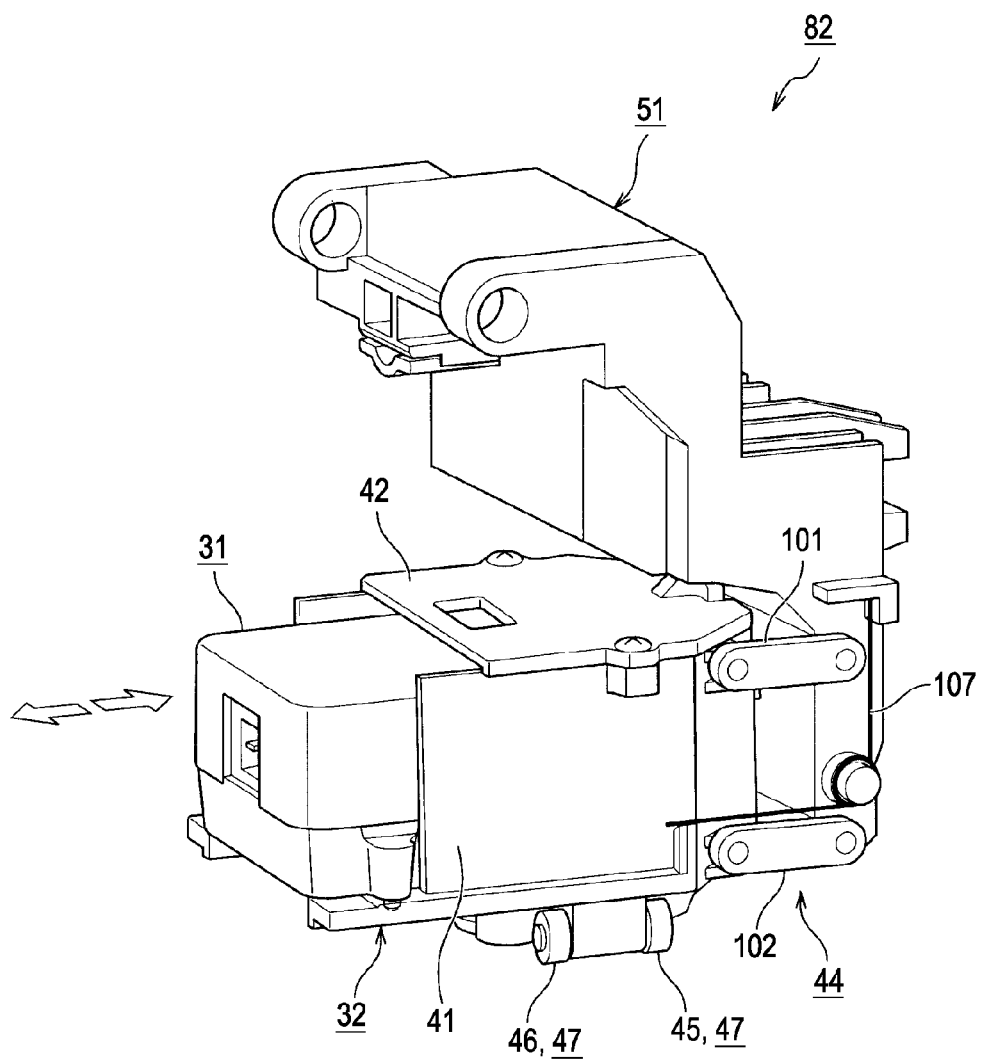
FIG. 7 is a perspective view showing the configuration of the colorimeter.
Figure 8:
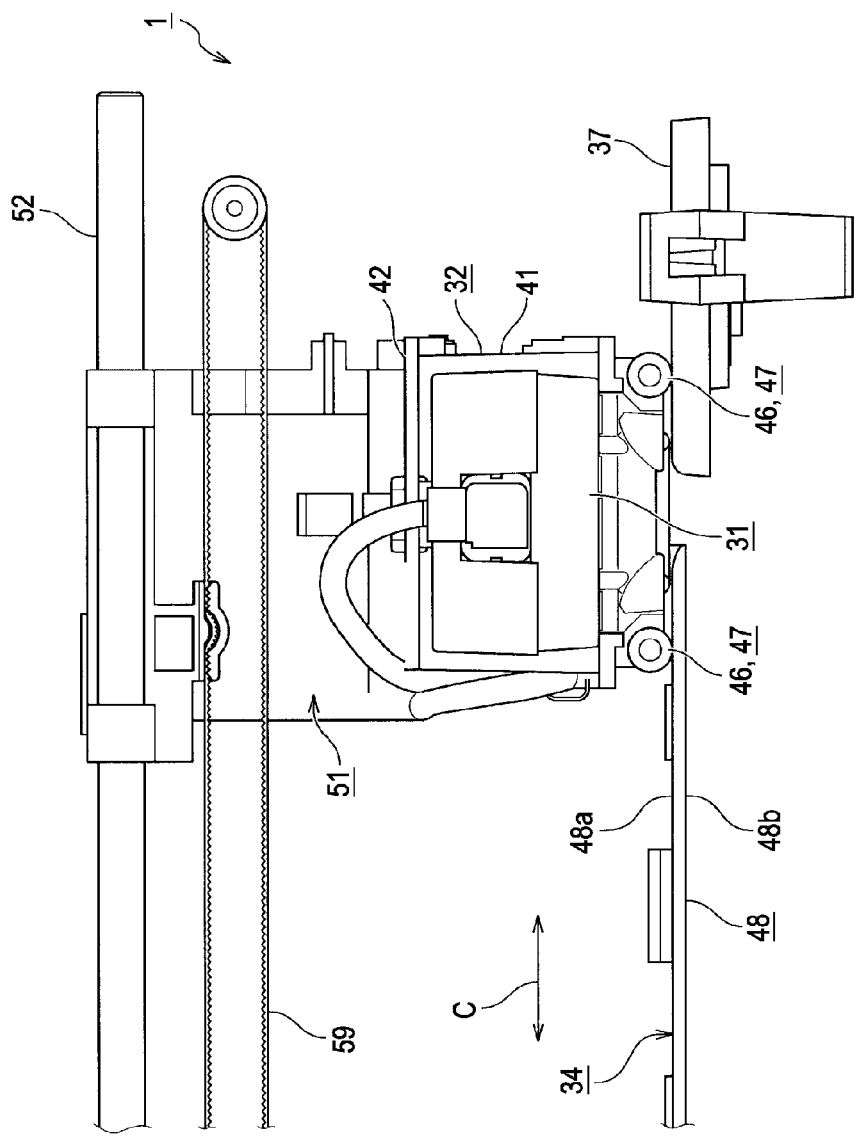
FIG. 8 is a front view of the colorimeter.
Figure 9:
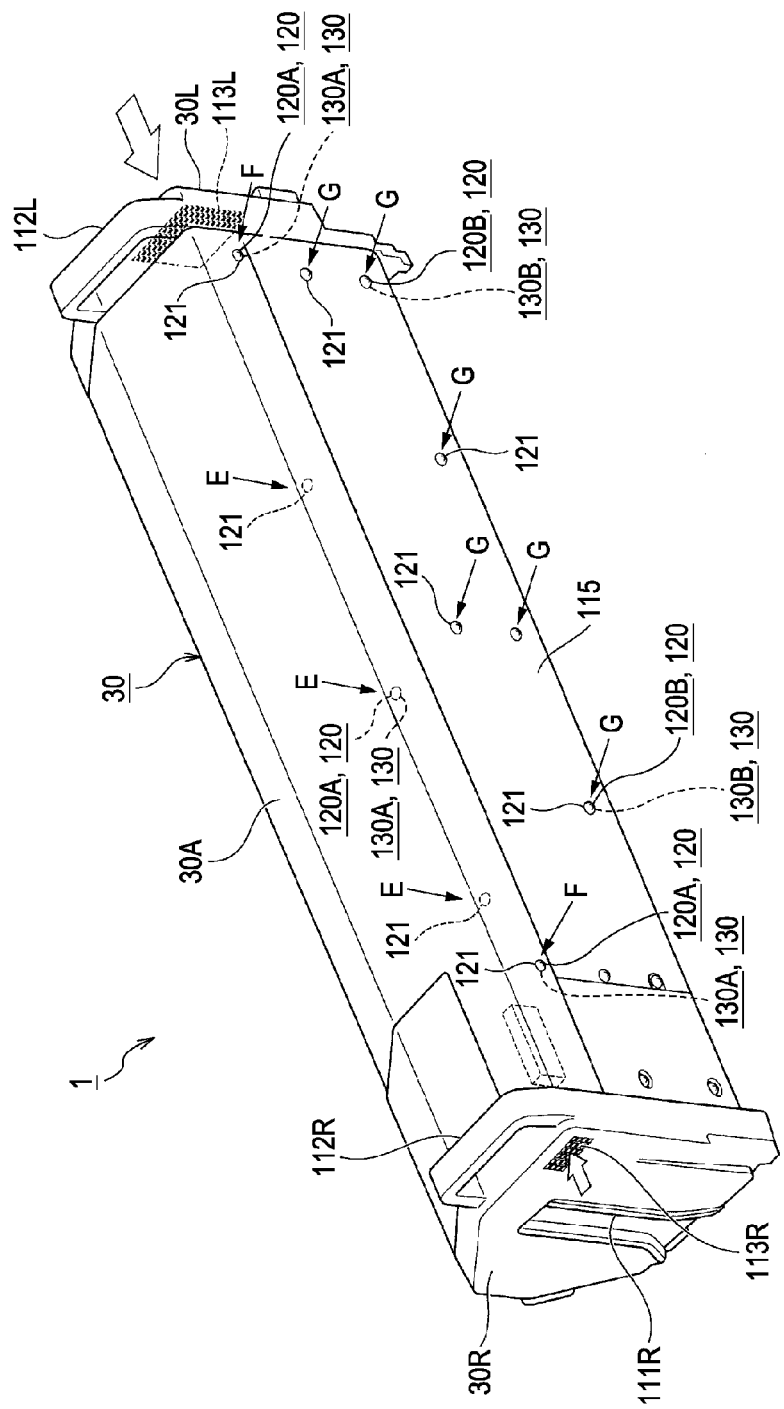
FIG. 9 is a perspective view of a colorimeter unit, as viewed from diagonally back.
Figure 10:
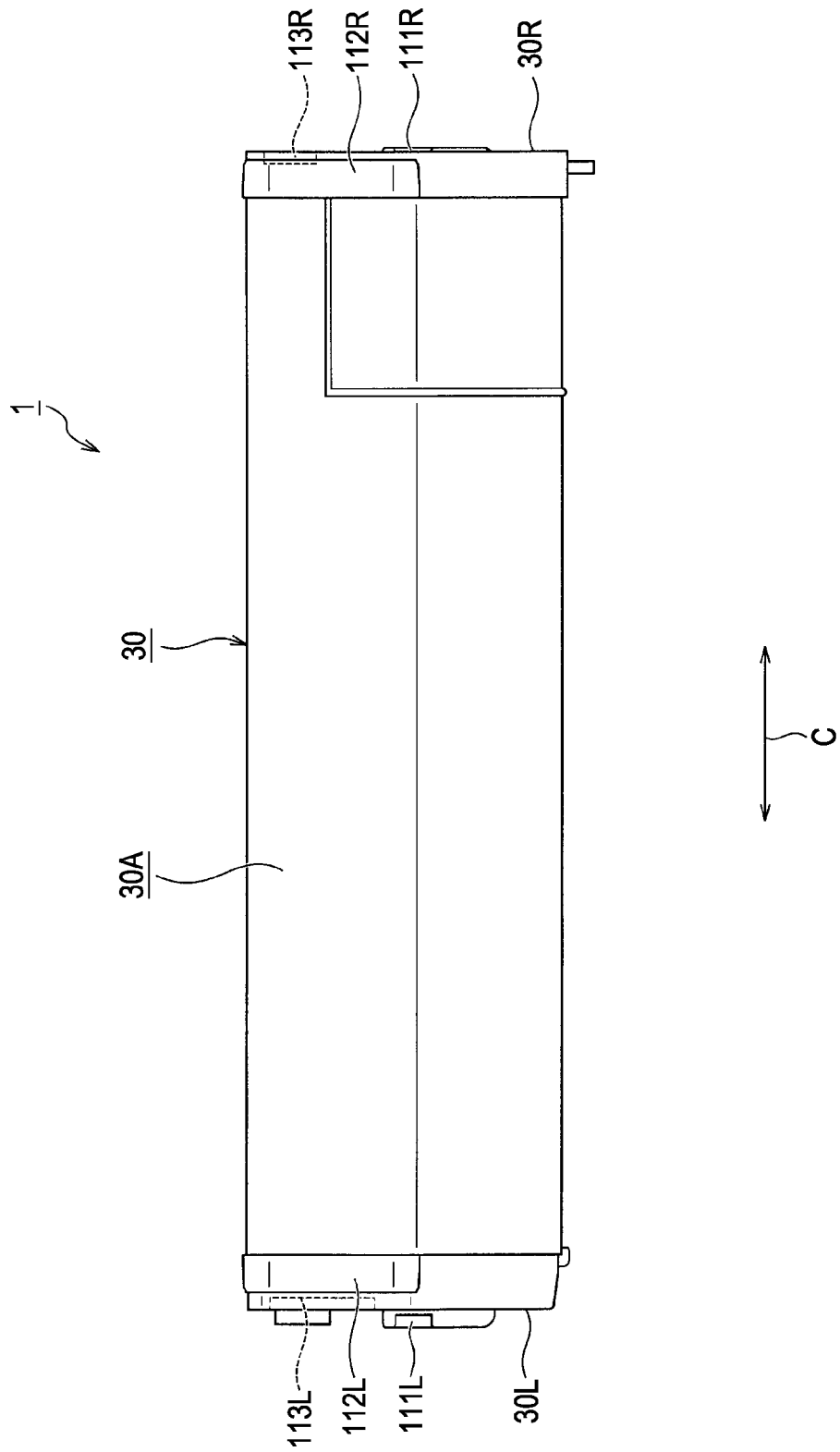
FIG. 10 is a plan view of the colorimeter unit.
Figure 11:
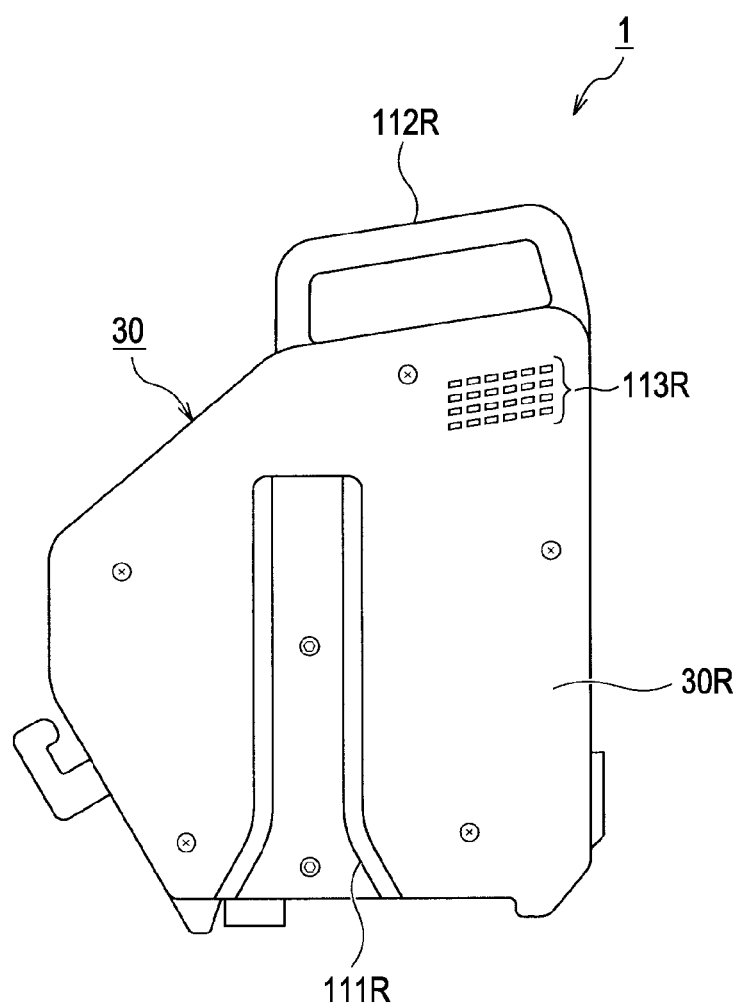
FIG. 11 is a right side view of the colorimeter unit.
Figure 12:
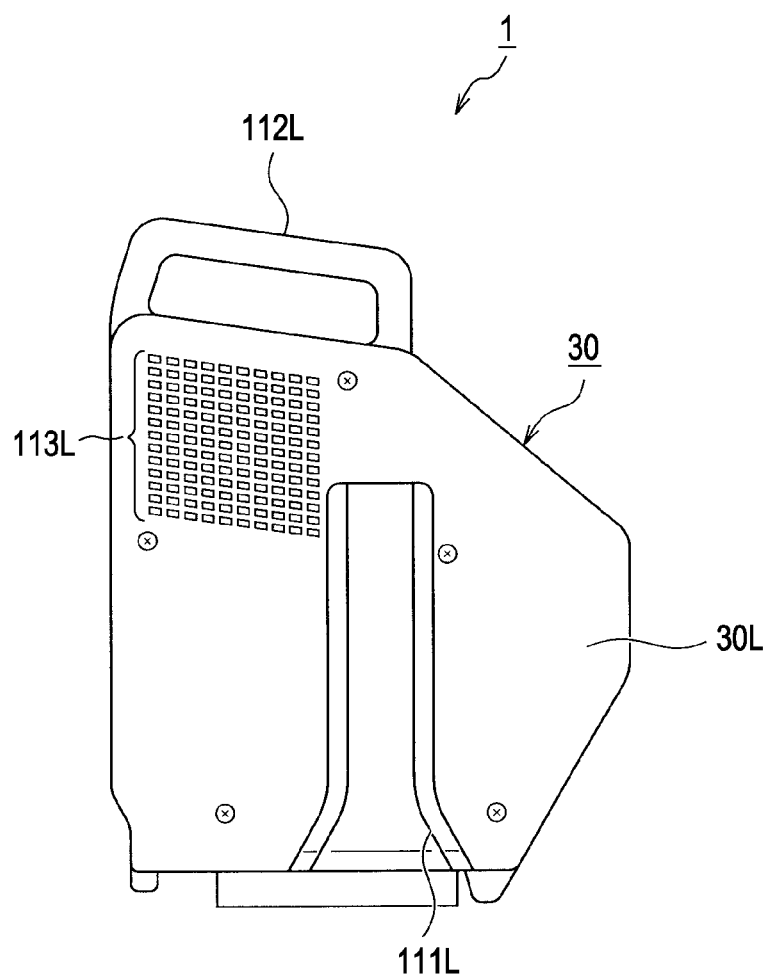
FIG. 12 is a left side view of the colorimeter unit.
Figure 13:
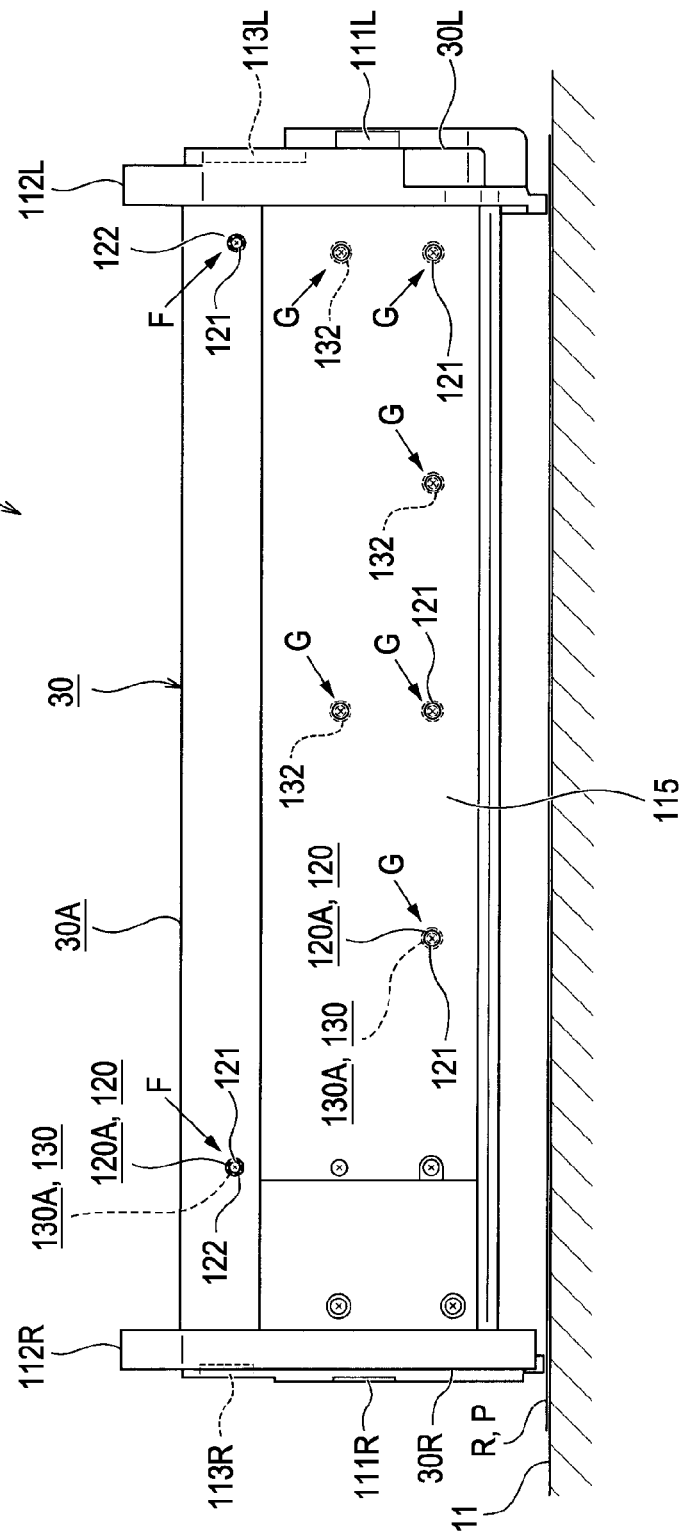
FIG. 13 is a back view of the colorimeter unit.
Figure 14:
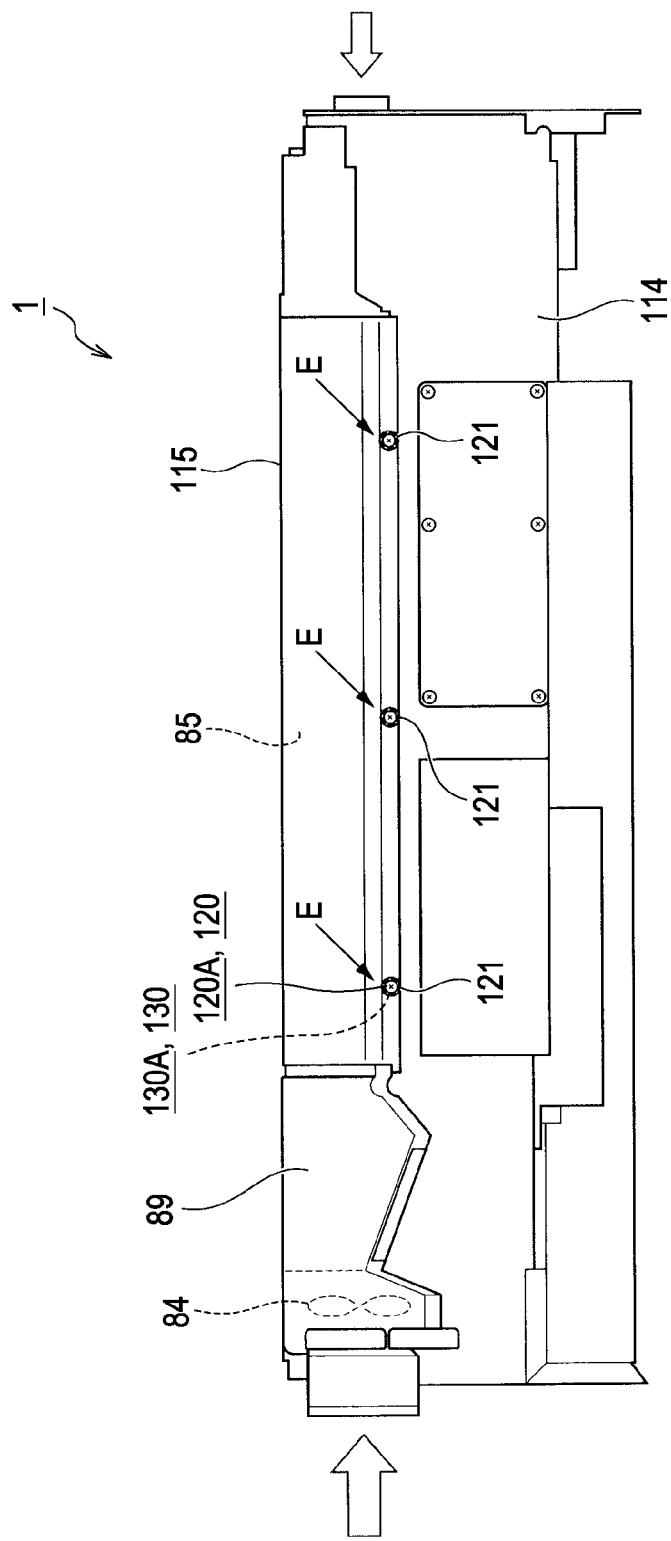
FIG. 14 is a plan view of the colorimeter unit, with a housing frame removed.
Figure 15:
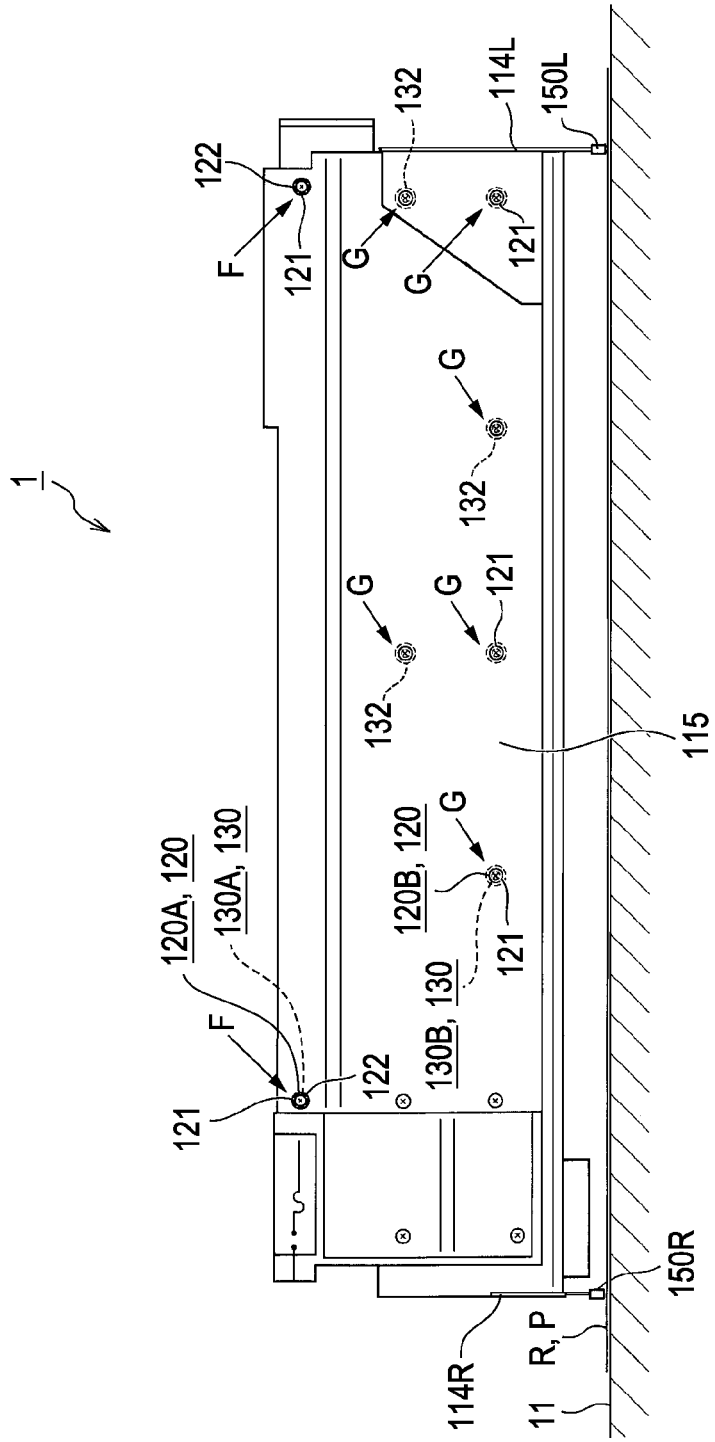
FIG. 15 is a back view of the colorimeter unit, with the housing frame removed.

FIG. 6 is a perspective view showing the operating state of a colorimeter 82 during color measurement; FIG. 7 is an enlarged perspective view showing the configuration of the colorimeter 82; FIG. 8 is a front view of the colorimeter 82; FIG. 9 is a perspective view of the colorimeter unit 1, as viewed from diagonally back; FIG. 10 is a plan view of the colorimeter unit 1; FIG. 11 is a right side view of the colorimeter unit 1; FIG. 12 is a left side view of the colorimeter unit 1; FIG. 13 is a back view of the colorimeter unit 1; FIG. 14 is a plan view of the colorimeter unit 1, with a housing cover 30A and side covers 30L and 30R removed; FIG. 15 is a back view of the colorimeter unit 1, with the housing cover 30A and the side covers 30L and 30R removed; and FIG. 16 is a side sectional view showing the assembled state of a main frame 114, a drier frame 115, and a housing 30.

Figure 16:
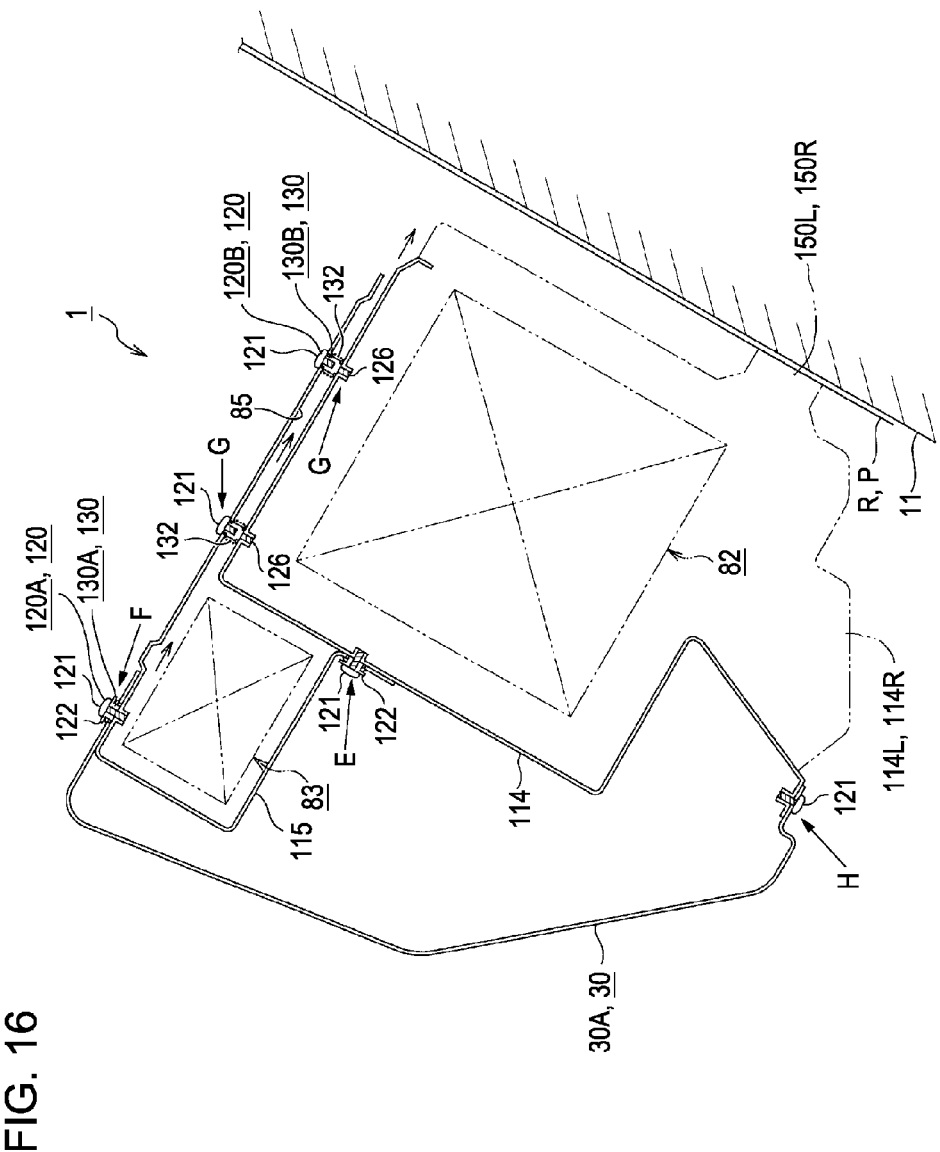
FIG. 16 is a side sectional view showing the assembled state of frames.

As shown in FIG. 16, the colorimeter unit 1 is a unit including the colorimeter 82, a drier 83, and the housing (third member) 30 that accommodates them. The housing 30 includes a housing cover 30A that covers the side bodies of the colorimeter 82 and the drier 83 and the side covers 30R and 30L that cover the right and left end surfaces of the colorimeter 82 and the drier 83.

As shown in FIGS. 9, 12, and 13, the left side cover 30L has a rib that protrudes outward to a large extent, and the recessed portion of the rib serves as a guide groove 111L that comes into engagement with a left-hand mounting shaft (not shown) provided at the recording-apparatus main body 3. The left side cover 30L is further provided with a handle 112L that is used to mount or dismount the colorimeter unit 1 to/from the recording-apparatus main body 3 and large-opening air intake ports 113L for supplying outside air to the drier 83.

As shown in FIGS. 9, 11, and 13, the right side cover 30R has a rib that slightly protrudes outward. The recessed portion of the rib serves as a guide groove 111R that comes into engagement with a right-hand mounting shaft (not shown) provided at the recording-apparatus main body 3. The right side cover 30R is also provided with a handle 112R that is used to mount or dismount the colorimeter unit 1 to/from the recording-apparatus main body 3 and small-opening air intake ports 113R for supplying outside air to the drier 83.

As shown in FIG. 5, the colorimeter unit 1 is configured such that the drier 83 is located downstream of the recording position 26, and the colorimeter 82 is located downstream of the drier 83.

As shown in FIGS. 5 to 8, the colorimeter 82 has a basic configuration including the color-measuring device 31, a color-measuring-device holder 32, a carriage reciprocating mechanism 33, a joint mechanism 44, a holding member 34, a rotation shift mechanism 35, a white tile 36, and a tile holder 37.

The color-measuring device 31 is a measuring instrument that radiates light onto a color-measuring pattern B (hereinafter, a color patch B, which is a typical example of the color-measuring pattern, is used) which is recorded on the recording surface of the roll paper R or the cut paper P and measures color information for color proofing, which is colorimetric data, on the basis of light reflected by the color patch B to obtain a correction value. An example of the color information is color information based on a Lab color mode in which color values are defined by white balance, chromaticity, and brightness. Because an RGB color mode is used at a monitor side, and a CMYK color mode is used at the ink-jet recording apparatus 100 side, the color information based on the Lab color mode measured by the color-measuring device 31 is converted to the RGB color mode or the CMYK color mode, and the correction value at the monitor side or the ink-jet recording apparatus 100 side is calculated for application.

The color-measuring-device holder 32 is a color-measuring device-31 holding member including a holder case 41 whose front, upper, and bottom surfaces open and a case cover 42 that covers the upper surface of the holder case 41. At the lower surface of the color-measuring-device holder 32, two pairs of moving wheels 47 each including a trailing-end wheel 45 and a free-end wheel 46 at the back and front, with the color-measuring region 80 interposed therebetween (FIG. 5), are provided at the right and left in a scanning direction C of the color-measuring device 31 (FIG. 6). In this embodiment, the trailing-end wheel 45 and the free-end wheel are configured using bearings, for example.

The carriage reciprocating mechanism 33 is a mechanism for moving the color-measuring device 31 held by the color-measuring-device holder 32 back and forth in the scanning direction C (FIG. 6). Specifically, the carriage reciprocating mechanism 33 is basically constituted of a color-measuring-device carriage 51 that is connected to the color-measuring-device holder 32 with the joint mechanism 44 and moves back and forth together with the color-measuring device 31, two guide shafts constituted of a main shaft 52 and a subshaft 53 that guide the movement of the color-measuring-device carriage 51, a carriage driving motor 54 serving as a driving source when moving the color-measuring-device carriage 51 back and forth, and an endless timing belt 59 that actually moves the color-measuring-device carriage 51 back and forth by a driving force from the carriage driving motor 54.

The stroke of scanning by the carriage reciprocating mechanism 33 in the scanning direction C is set to the length of the color patch B provided parallel thereto in the scanning direction C. Accordingly, the stroke is shorter than the stroke of the movement of the ink-jet recording apparatus 100 capable of recording up to the B0-plus size.

The joint mechanism 44 is a mechanism for allowing the moving wheel 47 provided on the lower surface of the holding member 34 to be moved in constant contact with a holding plate 48 of the holding member 34, to be described later (FIGS. 5 to 7). Specifically, the joint mechanism 44 is constituted of a parallel link mechanism including two sets of upper and lower links 101 and 102 at the right and left. The color-measuring-device holder 32 is configured to be moved toward the holding member 34 all the time due to the urging force of a pressure spring 107. The joint mechanism 44 also has a roll in smoothing the movement of the color-measuring-device holder 32 between the holding member 34 and a tile holder 37, to be described later.

The holding member 34 is a holding member that takes a pressing position to press the recording surface of the roll paper R or the cut paper P, on which the color patch B is recorded, between the holding member 34 and the holding surface (transport guide plate 11) during color measurement, and springs up while color measurement is not performed into a retracting position to allow transportation of the roll paper R or the cut paper P (FIGS. 6 and 8). Specifically, the holding member 34 includes a support arm 63 that rotates about 90° around a rotating shaft 62 integrated therewith, a flat holding plate 48 that is rotatably connected to the rotational free end of the support arm 63 via a rotating pin 64, and a holding-plate support spring and a holding-plate pressure spring (not shown) that are provided in a compressed state between the rotating arm 63 and the holding plate 48.

The support arm 63 is a curved plate-like arm that is long in the scanning direction C (FIG. 6). The support arm 63 is integrated with the rotating shaft 62 at the pivot point thereof so as to project outward to the right and left. Sector gears 67 having teeth over a range of about 90° are provided at the right and left of the rotating shaft 62. The pressure plate 48 is a rectangular flat member that is long in the scanning direction C. A window 49 extending in the scanning direction C is provided at the center of the upper surface of the pressure plate 48 so as to pass through the upper and lower surfaces of the pressure plate 48.

The window 49 is an opening for allowing the light radiated from the color-measuring device 31 and the light reflected from the roll paper R and the cut paper P to pass through. The upper surface of the pressure plate 48 around the window 49 serves as a guide surface 48$a$ that is in contact with and guides the trailing-end wheel 45 and the free-end wheel 46 provided on the lower surface of the color-measuring-device holder 32 described above. The lower surface of the pressure plate 48 around the window 49 serves as a pressure surface 48$b$ that directly press the recording surface of the roll paper R or the cut paper P that has reached the color-measuring region 80 and is held on the holding surface 11.

The rotation shift mechanism 35 is a shift mechanism for switching the holding member 34 between the pressing position and the retracting position (FIG. 6). Specifically, the rotation shift mechanism 35 includes a holding-member driving motor 70 serving as a driving source and a gearwheel train 71 for transmitting the rotation of the holding-member driving motor 70 to the sector gear 67.

The white tile 36 is a ceramic tile for executing the calibration of the color-measuring device 31 while color measurement is not performed (FIG. 6). The white tile 36 is detachably held by a tile holder 37. The tile holder 37 is a holding member for the white tile 36 provided in a home position region of the carriage reciprocating mechanism 33 beside the transport path through which the roll paper R or the cut paper P on which the color patch B is recorded passes. When color measurement is not performed during which the color-measuring-device carriage 51 is located at the home position, the color-measuring device 31 is located on the upper surface of the white tile 36 to serve as a cap, thereby preventing adhesion of dust etc. onto the upper surface of the white tile 36.

As shown in FIGS. 5, 14, and 16, the drier 83 includes a suction fan 84 that takes in air from the exterior, a heater 89 that heats the air taken in by the suction fan 84, and a chamber 85 that introduces the air taken-in to the drying region 81 located upstream of the color-measuring region 80 while heating it into warm air or leaving it as cool air. That is, the drier 83 is configured to use the space formed between a main frame 114 and a drier frame 115 as the chamber 85 of drying air.

As shown in FIGS. 9 and 16, the colorimeter unit 1 includes the main frame 114 which is a first member that supports the above-described colorimeter 82; the drier frame 115 which is a second member that supports the above-described drier 83; fastening devices 120 that fasten the main frame 114, the drier frame 115, and the above-described housing 30 which is the third member together; and flexible fastening mechanisms 130 that allow the relative movement of two members to be fastened.

As shown in FIG. 15, the main frame 114 has a left side frame 114L and a right side frame 114R connected thereto with a known structure using screws. The left side frame 114L and the right side frame 114R have contact protrusions 150L and 150R, respectively. The colorimeter unit 1 is mounted such that the guide grooves 111L and 111R formed in the side covers 30L and 30R are brought into engagement with the mounting shafts (not shown) at the recording apparatus main body 3 side, and the contact protrusions 150L and 150R come into contact with the transport guide frame 11 serving as the holding surface (FIGS. 15 and 16).

Figure 17:
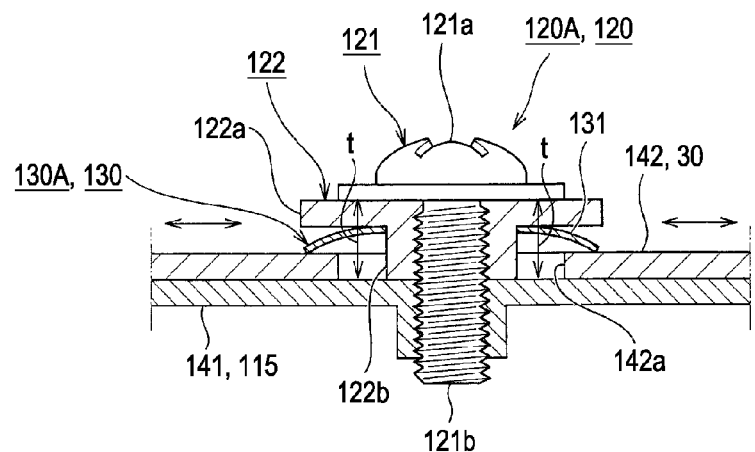
FIG. 17 is a sectional side view of a fastening device and a flexible fastening mechanism applied to the contact portions of the frames.

FIG. 17 is an enlarged sectional side view of a fastening device and a flexible fastening mechanism applied to the contact portions of the main frame 114, the drier frame 115, and the housing 30.

The fastening device 120 shown in FIG. 17 is attached to a portion at which two members to be fastened, for example, the housing 30 and the drier frame 115, are in contact with each other. Hereinafter, the fastening device 120 is referred to as a fastening device 120A, and the corresponding flexible fastening mechanism 130 is referred to as a flexible fastening mechanism 130A. The flexible fastening mechanism 130A of the fastening device 120A includes an elastic member 131 formed of a disc spring that is disposed on a surface of the housing 30 opposite a surface at which the housing 30 and the drier frame 115 are in contact.

The fastening device 120A further includes a fastening screw 121 for fastening the two members to be fastened and a spacer 122 serving as a retaining member for retaining the elastic member 131 in the gap t between the head 121$a$ of the fastening screw 121 and the housing 30 in a fastened state. The fastening device 120A is configured to allow the housing 30 and the drier frame 115 to move in a direction in which they come apart from each other against the elastic force of the elastic member 131 when an external force is exerted.

That is, in this embodiment, of the two members to be fastened, the drier frame 115 serves as a fixed frame 141, and the housing 30 serves as a movable frame 142. The elastic member 131 formed of a disc spring is compressed in the gap t between the movable frame 142 and the fastening device 120A, with the spacer 122 interposed between the movable frame 142 and the head 121a of the fastening screw 121.

The spacer 122 is a sleeve-like member that fits on a male thread 121b of the fastening screw 121 and has a flange 122a that overhangs outward like an eave at the top that is in contact with the head 121a of the fastening screw 121. The elastic member 131 is provided so as to fit on the sleeve-like body 122b of the spacer 122. The outside diameter of the body 122b is set smaller than the inside diameter of the mounting hole 142a formed in the movable frame 142, around which the above-described gap t is provided.

Figure 18:
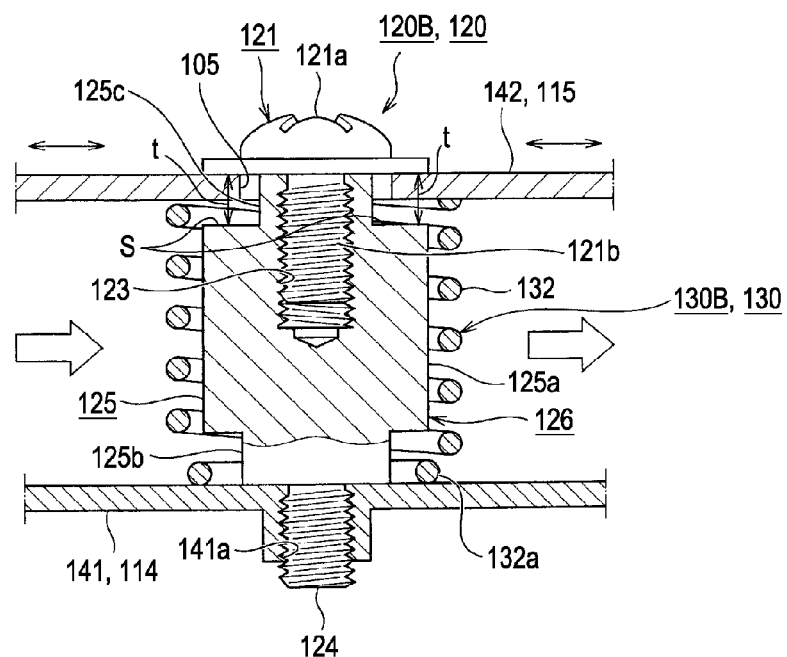
FIG. 18 is an enlarged sectional side view of a fastening device and a flexible fastening mechanism applied to the distant portion of the frames.

Next, FIG. 18 is an enlarged sectional side view of a fastening device and a flexible fastening mechanism applied to the distant portion of the main frame 114, the drier frame 115, and the housing 30.

The fastening device 120 shown in FIG. 18 is attached to a portion at which the two members to be fastened, that is, the main frame 114 and the drier frame 115, are away from each other. Hereinafter, the fastening device 120 is referred to as a fastening device 120B, and the corresponding flexible fastening mechanism 130 is referred to as a flexible fastening mechanism 130B. The flexible fastening mechanism 130B of the fastening device 120B includes an elastic member 132 that is a compressed coil spring between the main frame 114 and the drier frame 115.

The fastening device 120B further includes a positioning shaft 126, disposed between the main frame 114 and the drier frame 115 that are fastened apart from each other, for determining the relative position of (the distance between) the main frame 114 and the drier frame 115. The positioning shaft 126 has a body 125 located between the main frame 114 and the drier frame 115, and a male thread 124 at a first end thereof is fixedly screwed in the main frame 114. Furthermore, the fastening screw 121 is screwed in a second end of the positioning shaft 126. The drier frame 115, that is the second member, is located in the gap t between the head 121a of the screw 121 and the positioning shaft 126 and is pressed onto the head 121a of the screw 121 by the elastic member 132 for positioning. The fastening device 120B is configured to allow the main frame 114 and the drier frame 115, which are the two members, to move in a direction in which they come close to each other against the elastic force of the elastic member 131 when an external force is exerted.

The drier frame (the second member) 115 that is pressed onto the head 121a of the screw 121 has a mounting hole 105 through which the screw 121 passes. This may cause the chamber 85, which is a space enclosed by the main frame 114 and the drier frame 115, to communicate with the exterior through the mounting hole 105, to preclude providing sufficient air tightness required for the chamber 85.

However, according to this embodiment, since the periphery of the mounting hole 105 in the drier frame 115 is pressed onto the head 121a of the screw 121 due to the urging force of the elastic member 132, as described above, the mounting hole 105 is blocked from the exterior by the head 121a of the screw 121, thus preventing communication with the exterior.

That is, in this embodiment, of the two members to be fastened, the main frame 114 serves as the fixed frame 141, and the drier frame 115 serves as the movable frame 142. The fastening device 120B includes the fastening screw 121 and the positioning shaft 126. The positioning shaft 126 has a female thread 123 that screws on the male thread 121b of the fastening screw 121, the male thread 124 that screws in a female thread 141a formed in the fixed frame 141, and the body 125 disposed between the fixed frame 141 and the movable frame 142.

The positioning shaft 126 is a multistage shaft member having a large-diameter portion 125a at the center of the body 125, a middle-diameter portion 125b at the end of the body 125 adjacent to the fixed frame 141, and a small-diameter portion 125c at the end of the body 125 adjacent to the fastening screw 121. The female thread 123 is formed such that the center of the end face of the small-diameter portion 125c is bored to the vicinity of the center of the large-diameter portion 125a. The male thread 124 extends from the center of the end face of the middle-diameter portion 125b toward the fixed frame 141.

The middle-diameter portion 125b is reduced in diameter to form an engaging stage that engages with the elastic member 132 at the lower end of the body 125. Associated therewith, a retaining portion 132a whose coil diameter is larger than the diameter of the middle-diameter portion 125b and smaller than the diameter of the large-diameter portion 125a is formed at the lower end of the compressed coil spring 132 that constitutes the elastic member 132. The retaining portion 132a is retained to the middle-diameter portion 125b during assembly or the like to unintentionally prevent the compressed coil spring 132 from coming off from the positioning shaft 126. The outside diameter of the small-diameter portion 125c is set smaller than the inside diameter of the mounting hole 105 formed in the movable frame 142, in which the above-described gap t is formed.

As shown in FIG. 18, the upper end face S of the large-diameter portion 125a has roles in setting the bare minimum distance between the movable frame 142 and the fixed frame 141 and allowing the impact repulsive force of the elastic member 132 to act on the movable frame 142.

In this embodiment, the fastening device 120A having the spacer 122 (equipped with the flexible fastening mechanism 130A having the elastic member 131 formed of a disc spring) is applied to portions E and portions F shown in FIGS. 9, 13, 14, 15, and 16, and the fastening device 120B having the positioning shaft 126 (equipped with the flexible fastening mechanism 130B having the elastic member 132 formed of a compressed coil spring) is applied to portions G shown in FIGS. 9, 13, 15 and 16. To portion H shown in FIG. 16, a conventional fastening device formed of only the fastening screw 121 is applied. Such a configuration ensures the shape retaining performance of the main frame 114 in the direction of the beam (in the scanning direction C) and the self-shaping performance the holding surface against the distortion.

Next, the drying and color measurement of the color-measuring pattern B, executed using the thus-configured colorimeter unit 1, will be briefly described.

The roll paper R or the cut paper P on which the color patch B is recorded at the recording position 26 is transported to the drying region 81 on the holding surface (inclined guide plate 11) provided downstream in the transporting direction A. The color patch B is dried by the warm air or cool air coming from the drier 83 provided at the drying region 81.

After the drying of the color patch B is completed, the roll paper R or the cut paper P is further transported downstream in the transporting direction A to reach the color-measuring region 80. In the color-measuring region 80, the above-described colorimeter 82 is operated to hold the roll paper R or the cut paper P onto the transport guide frame 11, that is, the holding surface, with the holding member 34. Next, the carriage driving motor 54 is operated to move the color-measuring-device carriage 51 from the home position to the color-measuring region 80. Then, the color-measuring device 31 is moved back and forth in the scanning direction C to acquire desired colorimetric data.

Next, the operation of an embodiment of the invention will be described. According to this embodiment, the fastening device 120 (120A, 120B) is provided with the flexible fastening mechanism 130 (130A, 130B) that has at least one of the elastic members 131 and 132 and that allows the relative movement of two members (the housing 30 and the drier frame 115 in the example of FIG. 17, and the main frame 114 and the drier frame 115 in the example of FIG. 18) that are fastened against the elastic force of the elastic member 131 or 132. Thus, even if slight distortion is present on the surface of the recording apparatus main body 3 facing the color-measuring device 31, which is the holding surface 11 that holds a recording medium, with the colorimeter unit 1 mounted on the recording apparatus main body 3, the influence of the distortion can be absorbed by the flexible fastening mechanism 130 (130A, 130B).

That is, since the two members can relatively move against the elastic force of the elastic member 131 or 132, the colorimeter unit 1 can shape the overall form by itself along the distortion by transforming so as to absorb the distortion of the holding surface 11. This allows the distance between the color-measuring device 31 and the holding surface 11 to be held constant in the overall color-measuring region 80, thus preventing the colorimetric accuracy from decreasing.

Other Embodiments

While the recording apparatus 100 according to the embodiment of the invention has the basic configuration as described above, it will be obvious that modifications or omissions of partial configurations may be made without departing from the spirit of the invention.

For example, since the above-described colorimeter unit 1 is configured as a unit separate from the recording apparatus main body 3, the colorimeter unit 1 may not be mounted on the recording apparatus 100 at the factory but may be configured to be mounted on the recording apparatus main body 3 for use as an option.

The foregoing colorimeter unit 1 can be applied not only to the large-sized ink-jet recording apparatus 100 as in the above embodiments but also to a small- or middle-sized ink-jet recording apparatus.

A hard rubber sleeve-like member etc. may be used as the elastic member 131 (the disc spring is used in the foregoing embodiment) that is applied to a portion at which the fixed frame 141 and the movable frame 142 are in contact and the elastic member 132 (the compressed coil spring is used in the foregoing embodiment) that is applied to a portion at which the fixed frame 141 and the movable frame 142 are spaced apart.

The installed number and installation locations of the fastening devices 120 and the flexible fastening mechanisms 130 are not limited to the embodiments illustrated and can be changed as appropriate.

What is claimed is:

1. A recording apparatus including a colorimeter unit, the colorimeter unit comprising:
   a colorimeter including a color-measuring device that acquires colorimetric data from a recording surface of a recording medium, the color-measuring device supported by a cover;
   a first member that supports the colorimeter, the first member including a first wall extending transversely to medium transporting direction;
   a drier that generates drying-air;
   a second member fastened to the first member using a fastening device, a second wall of the second member being parallel to the first wall; and
   a housing member having a first portion fastened to the first member and a second portion fastened to the second member such that the first and second portions of the housing member only partially enclose the colorimeter,
   wherein a space between the first member and the second member, defined by at least a portion of the first wall and the second wall, defines a drying-air chamber that is configured such that the drying-air is able to flow through the chamber, wherein the drying-air chamber has a drying-air supply inlet adjacent the drier spaced further from recording medium than the cover and a drying-air supply configured to supply the drying-air towards the recording medium, the drying-air supply inlet and the drying-air supply opening both being located on a upstream side of the color-measuring device in the medium transporting direction, the second portion of the housing member being adjacent the drying-air chamber and defining at least a portion of the drying-air chamber,
   wherein the fastening device has an elastic member and a multistage positioning shaft and fastens the first member and the second member together relatively movably against the elastic force of the elastic member disposed between the first member and the second member, the multistage positioning shaft having an intermediate portion with a diameter larger than a first end portion and a second end portion, a first shoulder formed by the intermediate portion and the first end portion being adjacent the first member and a second shoulder formed by the intermediate portion and the second end portion adjacent the second member, the multistage positioning shaft movably biased through the second member by the elastic member with the second shoulder, disposed between the first member and the second member, limiting a relative movement between the first member and the second member.

2. The recording apparatus according to claim 1, further comprising:
   a recording medium supporting unit which supports the recording medium; and
   a drier that generates the dry-air that flows through the drying-air chamber,
   wherein the color-measuring device is located between the recording medium supporting device and the dryer.

3. The recording apparatus according to claim 2, further comprising:
   a calibration unit which calibrates the color-measuring device, wherein the color-measuring device caps the calibration unit when a color measurement is not performed.

4. The recording apparatus according to claim 1, further comprising a second fastening device, wherein
   the second fastening device is attached to a portion at which the first and second members to be fastened are in contact with each other; and
   the second fastening device is configured such that a second elastic member is disposed on an outer surface of at least the first member to be fastened, the outer surface being opposite an inner surface thereof at which the first and second members are in contact, and that the first and second members can move in a direction in which the first and second members separate from each other against the elastic force of the elastic member.

5. The recording apparatus according to claim 4, wherein the second fastening device further includes:
- a fastening screw; and
- a spacer that determines a gap between the head of the screw and the first member of the two members, and
- the elastic member is located in the gap.

6. The recording apparatus according to claim 1, wherein
- the fastening device is attached to a portion at which the first and second members to be fastened are spaced apart; and
- the fastening device is configured such that the elastic member is disposed between the first and second members to be fastened, and that the two members can move in a direction in which the first and second members come close to each other against the elastic force of the elastic member.

7. The recording apparatus according to claim 6, wherein the fastening device further includes:
- the positioning shaft that is located between the first and second members to be fastened apart from each other, a first end of the positioning shaft being fixed to the first member, and that determines the relative positions of the first and second members; and
- a screw fastened to a second end of the positioning shaft,
- wherein the second member of the first and second members is located in a gap provided between a head of the screw and the positioning shaft and is pressed onto the head of the screw for positioning by the elastic member.

8. The recording apparatus according to claim 6, wherein the elastic member can be retained to the positioning shaft.

* * * * *